United States Patent [19]
Hamilton et al.

[11] Patent Number: 5,494,301
[45] Date of Patent: Feb. 27, 1996

[54] WRAPPED COMPOSITE GASKET MATERIAL

[75] Inventors: Elizabeth M. Hamilton; Eric W. Lalli, both of Elkton, Md.; Cindy B. Lubin, Phoenixville, Pa.; Wanda F. Sparks; Alfred F. Waterland, III, both of Elkton, Md.

[73] Assignee: W. L. Gore & Associates, Inc., Newark, Del.

[21] Appl. No.: 50,903

[22] Filed: Apr. 20, 1993

[51] Int. Cl.⁶ ................................................. F16J 15/10
[52] U.S. Cl. ..................... 277/227; 277/229; 277/DIG. 6
[58] Field of Search ........................... 277/227, 229, 277/230, DIG. 6

[56] References Cited

U.S. PATENT DOCUMENTS

| | | | |
|---|---|---|---|
| 2,459,721 | 1/1949 | Poltorak | 277/229 |
| 2,893,105 | 7/1959 | Lauterbach | 28/72.2 |
| 3,756,004 | 9/1973 | Gore | 264/288 |
| 3,878,031 | 4/1975 | Dormer | 277/230 X |
| 3,953,566 | 4/1976 | Gore | 57/11 |
| 4,330,136 | 5/1982 | Henson | 277/229 X |
| 4,576,861 | 3/1986 | Kato | 428/316.6 |
| 4,823,229 | 4/1989 | Waterland, III | 277/227 X |
| 4,898,638 | 2/1990 | Lugez | 156/272.6 |
| 5,072,952 | 12/1991 | Irrgeher et al. | 277/229 |
| 5,160,773 | 11/1992 | Sassa | 428/76 |

FOREIGN PATENT DOCUMENTS

| | | |
|---|---|---|
| 0159942 | 10/1985 | European Pat. Off. . |
| 0304141 | 2/1989 | European Pat. Off. . |
| 47-62658 | 6/1972 | Japan . |
| 49-75565 | 7/1974 | Japan . |
| 57-051450 | 3/1982 | Japan . |

OTHER PUBLICATIONS

Inertex Valve Stem Packing Literature, Inertech Supply, Inc., 1989.
Gore–Tex® Valve Stem Packing, W. I. Gore & Associates, Inc.
Literature: APV Model HxCB Paraglow PlateHeat Exchanger, 6 pages APV Crepaco, Inc., May, 1985.
Literature: Mueller® Accu–Therm® PlateHeat Exchangers, No date.

Primary Examiner—William A. Cuchlinski, Jr.
Assistant Examiner—John L. Beres
Attorney, Agent, or Firm—Gary A. Samuels

[57] ABSTRACT

A composite gasket material composed of a core of elongated polytetrafluoroethylene wrapped with a high strength porous expanded polytetrafluoroethylene film is provided. The composite gasket material exhibits increased resistance to creep while in use so that thickness of the composite gasket material and thus gasket stress is maintained.

33 Claims, 3 Drawing Sheets

WRAPPED COMPOSITE GASKET MATERIAL

FIELD OF THE INVENTION

This invention relates to the field of polymeric gasket material, more particularly, to gasket material of porous expanded polytetrafluoroethylene.

BACKGROUND OF THE INVENTION

Polytetrafluoroethylene (PTFE) has demonstrated utility as a material in many different areas. As an industrial material, such as for example a gasket, polytetrafluoroethylene has exhibited utility as a material for use in harsh chemical environments which normally degrade many conventional metals and polymeric materials. Polytetrafluoroethylene is also usable over a broad temperature range, from as high as 260° C. to as low as near −273° C.

However, conventional non-porous polytetrafluoroethylene gasket materials which have been compression molded or extruded and subsequently heated to a temperature above 345° C. exhibit poor mechanical properties, such as low tensile strength and low cold flow resistance, thereby limiting their use in areas requiring a measure of physical strength and resistance to cold flow (also known as creep).

Polytetrafluoroethylene may be produced in a porous expanded form as taught in U.S. Pat. No. 3,953,566 to Gore. Porous expanded polytetrafluoroethylene (ePTFE) is of a higher strength than unexpanded forms of polytetrafluoroethylene, has the chemical inertness of polytetrafluoroethylene, and when used as a gasket has even a wider temperature range of use, to as high as 315° C. An example of a porous expanded polytetrafluoroethylene gasket material is Gore-tex® Joint Sealant (manufactured by W. L. Gore & Associates, Inc, Elkton, Md.). Porous expanded polytetrafluoroethylene joint sealants provide excellent seals in applications having relatively wide sealing surfaces and where sufficient clamping loads can be applied to them so that, as the sealant spreads between the sealing surfaces to form a thin wide gasket, the level of compressive stress needed to densify the gasket and to provide the desired sealability is developed. Consequently, they are not well suited to applications having narrow sealing surfaces or requiring relatively thick gaskets.

Porous expanded polytetrafluoroethylene gasket materials which have not been fully compressed will not perform as a barrier to organic liquids having surface tensions under 50 dynes/cm$^2$. Also, they will exhibit a higher measure of creep (cold-flow) which results in a loss of thickness and an increased width of the gasket over time. Both the loss of gasket thickness and the increase in the gasket width contribute to a lower surface stress of the gasket in service.

Polytetrafluoroethylene sealant materials consisting of polytetrafluoroethylene cores upon which are wrapped tapes of polytetrafluoroethylene are known in the art. For example, Gore-tex® Valve Stem Packing (manufactured by W. L. Gore & Associates, Inc., Elkton, Md.) and Inertex® Valve Stem Packing (available from Inertech, Inc., Monterey Park, Calif.), consist of porous expanded polytetrafluoroethylene cores upon which are wrapped tapes of porous expanded polytetrafluoroethylene. Both of these commercially available wrapped PTFE sealant materials are suitable for use as a compression packing where they are confined within a defined volume, however, when used as a gasket in an unconfined volume they exhibit undesirable creep characteristics over a period of time when under a compressive load. U.S. Pat. No. 5,160,773 (to Sassa) describes a sealing material of polytetrafluoroethylene felt encapsulated by a porous polytetrafluoroethylene sheet laminated to a melt-processible thermoplastic fluoropolymer. The encapsulated polytetrafluoroethylene felt material is engineered for use as a "wiper" seal for moving surfaces in which very low clamping forces are applied to the seal surfaces to obtain a seal against low pressure fluids. The encapsulated felt material is not suited for use as a static seal against gases or fluids under pressure as a very high clamping load is required to compress it and, as with the materials described above, the encapsulated felt material deforms to a thin wide shape as it becomes fully compressed and exhibits undesirable creep characteristics. The outer wrap of the encapsulated felt is intended only to render the seal liquid-impermeable and does not have sufficient strength to retard cold-flow of the core under high compressive stresses.

As a result of dimensional changes due to cold flow or creep, many commercially available polytetrafluoroethylene gaskets require additional clamping force applied to the gasket some period of time after installation of the gasket. This is a highly undesirable property in a gasket material. Repetitive adjustment of clamping force is not possible in uses where a specific height of gasket must be maintained during use for functional or safety reasons. For example, when used as static seals between multiple plates of plate-and-frame heat exchangers and plate-and-frame filters any creep-induced thickness reduction of the gasket material between the plates is additive and, when multiplied by the number of plates in the unit, can result in a significant reduction in the gasket clamping load which can lead to severe uncorrectable leakage problems.

BRIEF DESCRIPTION OF THE INVENTION

The instant invention is directed to a wrapped gasket material having a core of elongated polytetrafluoroethylene upon which is wrapped an expanded polytetrafluoroethylene film having high strength which is capable of preventing substantial lateral flow of the polytetrafluoroethylene core under load while in use, and thereby maintaining a desired height-to-width aspect ratio in the compressed gasket.

A high strength film as used herein is meant a film having in at least one direction a maximum tensile strength of 13.8 MPa (2,000 psi) or greater and a 2% secant tensile modulus of 172 MPa (25,000 psi) or greater when tested by the method provided herein. The 2% secant tensile modulus is the ratio of tensile stress/strain at 2% elongation and is an indicator of the resistance of the film to stretching or deformation at low strain; the higher the value the greater the resistance to stretching or deformation.

Another embodiment of the invention comprises a core of elongated polytetrafluoroethylene wrapped with a high strength porous expanded polytetrafluoroethylene film which is coated on one side with a melt-processible thermoplastic fluoropolymer; the melt-processible thermoplastic fluoropolymer in contact with and adhering the porous expanded polytetrafluoroethylene film to the core of polytetrafluoroethylene.

Yet another embodiment of the invention comprises either of the embodiments described above and further comprises a second porous expanded polytetrafluoroethylene film, either uncoated or coated with a melt-processible thermoplastic fluoropolymer, wrapped upon and adhered to the high strength first porous expanded polytetrafluoroethylene film.

The second porous expanded polytetrafluoroethylene film may also be a high strength film to impart greater creep-resistance to the assembly or, to enhance sealability of the gasket material, may have lower tensile strength and lower tensile modulus than the high strength first porous expanded polytetrafluoroethylene film.

In order to impart or enhance certain properties in the gasket material of the invention, such as electrical conductivity, thermal conductivity, dimensional stability, etc., other embodiments of the invention can include cores of polytetrafluoroethylene wrapped with porous expanded polytetrafluoroethylene films, either or both of which can contain particulate filler materials which provide the desired properties.

DETAILED DESCRIPTION OF THE INVENTION

Figure 1:
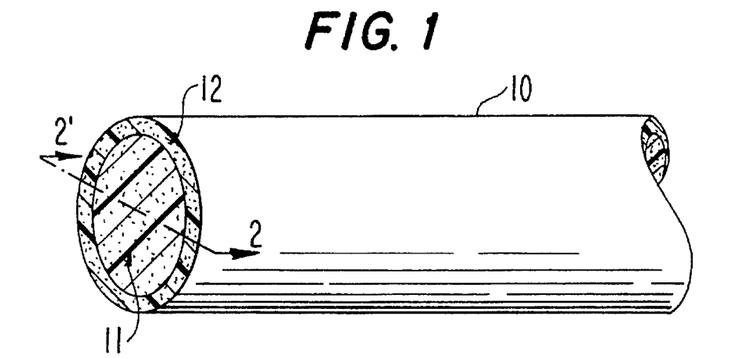
FIG. 1 is a perspective view of an embodiment of the invention wrapped with an uncoated high strength porous expanded polytetrafluoroethylene film.
Figure 2:
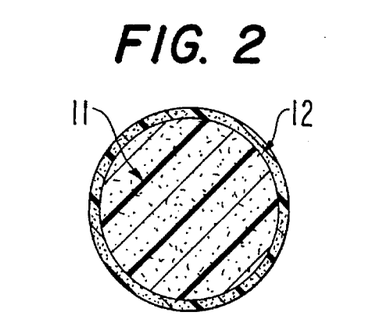
FIG. 2 is a cross-sectional view taken through 2,2' of FIG. 1.

The product of this invention is best described with reference to the Figures. Referring to FIG. 1, a composite gasket material 10 of the instant invention is depicted in perspective. FIG. 2 depicts a cross-section of the instant invention taken along line 2,2' of FIG. 1. The composite gasket material 10 comprises a core of elongated polytetrafluoroethylene (PTFE) 11 upon which is wrapped a high strength polytetrafluoroethylene film 12.

The core of elongated polytetrafluoroethylene 11 can be formed from shaped articles of expanded or unexpanded polytetrafluoroethylene, for example, sheet, film, fibers, and yarns can be rolled, twisted, or braided to form a suitable core material. The core is not a felt. The core of elongated polytetrafluoroethylene 11 is preferably a porous polytetrafluoroethylene, more preferably a porous expanded polytetrafluoroethylene. The preferred core material is prepared by paste extrusion of PTFE fine powder to form a rod or beading by methods and equipment well known in the art. The paste extruded rod or beading is then expanded to form a flexible porous structure of nodes interconnected by fibrils by stretching it according to the process taught in U.S. Pat. No. 3,953,566 to Gore. The paste extruded polytetrafluoroethylene rod or beading is stretched in the longitudinal direction an amount in the range 2:1 to 25:1, preferably an amount in the range 3:1 to 12:1, depending on the strength and compressibility properties desired in the core material. Prior to wrapping, the elongated porous polytetrafluoroethylene core material 11 has a surface shape that permits the film 12 to be wrapped in continuous contact with the surface of the core material. Preferably, the elongated porous polytetrafluoroethylene core material 11 has a circular cross-section, however, oval, square, rectangular, and other shapes with no recessed surfaces can also be used. More complex shapes, e.g., surfaces with depressions or projections, can be formed after the core material has been wrapped.

The elongated polytetrafluoroethylene core may contain a particulate filler. The term "particulate" is meant to include particles of any aspect ratio and thus includes chopped fibers, whiskers, and the like. The particulate filler may be an inorganic filler which includes metals, semi-metals, metal oxides, carbon, graphite, and glass. Alternatively, the particulate filler may be an organic filler, which includes polymeric resins. Suitable resins include, for example, polyether ether ketone (PEEK), fluorinated ethylene propylene (FEP), copolymer of tetrafluoroethylene and perfluoro(propylvinyl ether)(PFA), and other like high melting polymers.

Particulate fillers, when used, are selected to impart or enhance certain properties in the core or wrapping film according to the application in which the composite gasket material of the invention will be used. For example, they can be used to impart or enhance properties such as electrical conductivity and thermal conductivity, and can also be used to modify compressibility and dimensional stability properties of the composite gasket material. Particulate fillers can be used in concentrations as high as 90 volume percent, but are more generally used in the concentration range 10–70 volume percent.

The particulate filler and PTFE fine powder may be combined using conventional dry mixing methods after which they can be formed to provide the core material of the invention by the process taught in U.S. Pat. No. 3,953,566 to Gore referenced hereinabove. Alternatively, the particulate filler may be mixed with PTFE in aqueous dispersion and coagulated together to form a wet mixture of solids. The water is removed from the mixture by standard drying methods and the mixture further processed in the same manner as dry mixed materials.

Still referring to FIGS. 1 and 2, the high strength polytetrafluoroethylene film 12 is preferably a porous expanded polytetrafluoroethylene film as produced by the process taught in U.S. Pat. No. 3,953,566 to Gore. By stretching a paste-formed polytetrafluoroethylene sheet in one or more directions as taught in U.S. Pat. No. 3,953,566 (Col.2, Lines 7–9), a porous expanded polytetrafluoroethylene film having high strength is produced (Col.3, Lines 4–8). The high strength porous expanded polytetrafluoroethylene film may be made by stretching uniaxially, either in longitudinal or transverse direction; or biaxially, in both longitudinal and transverse directions, sequentially or simultaneously. The high strength expanded polytetrafluoroethylene film is preferably uniaxially stretched in the longitudinal direction an amount in the range 2:1 to 150:1, more preferably an amount in the range 2:1 to 80:1.

Longitudinal direction as used herein indicates the planar direction of manufacture of the film; transverse direction indicates the planar direction normal to the direction of manufacture.

Figure 3:
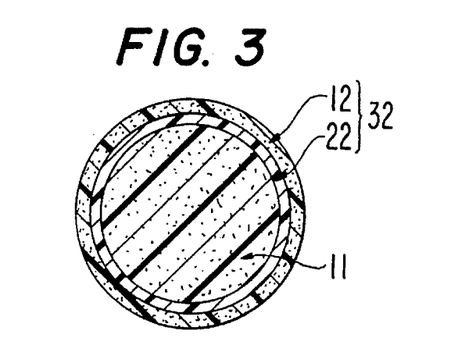
FIG. 3 is a cross-sectional view of an embodiment of the invention wrapped with a coated high strength composite film.

Referring now to FIG. 3, the high strength polytetrafluoroethylene film is, more preferably, a composite film 32 comprising a high strength porous expanded polytetrafluoroethylene film 12 adhered to a thin layer of melt-processible thermoplastic fluoropolymer 22. By thin is meant a thickness of 30 micrometers or less, preferably 20 micrometers or less, more preferably 10 micrometers or less. The expanded layered composite film is produced in the following manner.

PTFE fine powder, which may be combined with the same particulate filler materials and prepared as described hereinabove, is mixed with a hydrocarbon extrusion aid, usually an odorless mineral spirit, to form a paste. The paste is compressed into a billet and subsequently extruded through a die in a ram-type extruder to form a coherent planar sheet. The coherent polytetrafluoroethylene sheet, with or without particulate filler materials, is optionally calendered and then dried by volatilizing the hydrocarbon extrusion aid with heat. Evaporation of the hydrocarbon extrusion aid results in the polytetrafluoroethylene sheet having a small degree of porosity. The resulting porous polytetrafluoroethylene sheet is now ready to be combined with a melt-processible thermoplastic fluoropolymer film and the combined sheets expanded together. However, if a highly porous expanded polytetrafluoroethylene film is desired, the porous polytetrafluoroethylene sheet may be preliminarily expanded by stretching it at 200°–300° C. about 1.5 to 5 times its original length prior to combining it with the melt-processible thermoplastic fluoropolymer.

The porous polytetrafluoroethylene sheet is combined with the melt-processible thermoplastic fluoropolymer film by placing the melt-processible thermoplastic fluoropolymer film on the porous polytetrafluoroethylene sheet and heating the combination to a temperature between the melt point of the melt-processible fluoropolymer and 365° C. The porous polytetrafluoroethylene sheet is kept under tension when heated thereby maintaining its dimensions while the melt-processible thermoplastic fluoropolymer layer is combined with it. As the porous polytetrafluoroethylene sheet is heated to a temperature above the melt point of the melt-processible thermoplastic fluoropolymerlayer, the melt-processible thermoplastic fluoropolymer layer in contact with the porous polytetrafluoroethylene sheet at least partially melts and flows onto the surface of the porous polytetrafluoroethylene sheet thereby forming a composite precursor, i.e., a coated porous polytetrafluoroethylene sheet ready to be expanded.

The coated porous polytetrafluoroethylene sheet is expanded according to the method taught in U.S. Pat. No. 3,953,566 to Gore. The temperature range at which expansion of the coated porous polytetrafluoroethylene sheet is performed is between a temperature at or above the melt point of the melt-processible thermoplastic fluoropolymer layer and a temperature at or below the melt point of polytetrafluoroethylene. The coated porous polytetrafluoroethylene sheet may be stretched uniaxially, either in a longitudinal or transverse direction; or biaxially, in both longitudinal and transverse directions, sequentially or simultaneously. It may be stretched in one or more steps.

The coated porous polytetrafluoroethylene sheet forms a porous expanded polytetrafluoroethylene film as it is stretched. The expanded polytetrafluoroethylene film is characterized by a series of nodes interconnected by fibrils. As the coated porous polytetrafluoroethylene sheet is expanded to form the high strength porous expanded polytetrafluoroethylene film, the melt-processible thermoplastic fluoropolymer layer adhered to it is carried along the surface of the expanding sheet while in a melted state, thereby becoming progressively thinner and forming a thin melt-processible thermoplastic fluoropolymer layer on the porous expanded polytetrafluoroethylene sheet. The thin melt-processible thermoplastic fluoropolymer layer has a thickness of 30 micrometers or less. The thin melt-processible thermoplastic fluoropolymer preferably has a thickness of one half, more preferably one tenth, of the thermoplastic fluoropolymer film's original thickness. For example, a thermoplastic fluoropolymer film originally having a thickness of 25.4 micrometers (1 mil) could produce a thin thermoplastic fluoropolymer layer having a thickness as low as about 2.5 micrometers (0.1 mil) or less after expansion of the porous polytetrafluoroethylene sheet into the porous expanded polytetrafluoroethylene article.

The means for heating the porous expanded polytetrafluoroethylene sheet may be any means for heating commonly known in the art including, but not limited to, a convection heat source, a radiant heat source or a conduction heat source. The conduction heat source may be a heated surface such as a heated drum, roll, curved plate, or die. When a conduction heat source is used as the means for heating the coated porous expanded polytetrafluoroethylene sheet, the uncoated surface of the sheet should be against the conduction heat source so to prevent sticking and melting of the melt-processible thermoplastic fluoropolymer layer upon the conduction heat source.

Thermoplastic fluoropolymers which are of utility as the melt-processible thermoplastic fluoropolymer layer have melt points of 342° C. or less. They include copolymer of tetrafluoroethylene and hexafluoropropylene (FEP), copolymer of tetrafluoroethylene and perfluoro(propylvinyl ether)(PFA), homopolymers of polychlorotrifluoroethylene (PCTFE) and its copolymers with TFE or VF2, ethylenechlorotrifluoroethylene (ECTFE) copolymer, ethylenetetrafluoroethylene (ETFE), polyvinylidene fluoride (PVDF), and polyvinylfluoride (PVF). Thermoplastic fluoropolymers are preferred as the melt-processible thermoplastic fluoropolymer since they are similar in nature to polytetrafluoroethylene, having melt points near the lowest crystalline melt point of polytetrafluoroethylene, and therefore are relatively high temperature thermoplastic polymers. Thermoplastic fluoropolymers are also relatively inert in nature and therefore exhibit resistance to degradation from many chemicals.

The melt-processible thermoplastic fluoropolymer film can act as an adhesive to adhere the high strength porous expanded polytetrafluoroethylene film to the surfaces of other materials.

Still referring to FIG. 3, the expanded layered composite film 32 is wrapped on the core of elongated polytetrafluoroethylene 11 so that the thin layer of melt-processible thermoplastic fluoropolymer 22 contacts the core of elongated polytetrafluoroethylene 11. An amount of heat is introduced into the expanded layered composite film 32 to cause the thin layer of melt-processible thermoplastic fluoropolymer 22 to at least partially melt and adhere to the core of elongated polytetrafluoroethylene 11.

Figure 4:
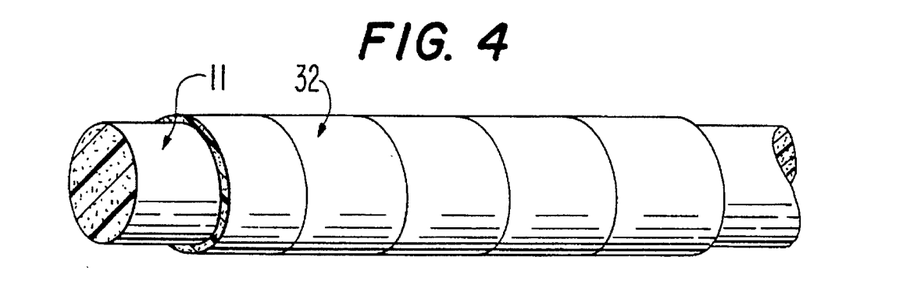
FIG. 4 is a perspective view of a helically wrapped embodiment of the invention.

Referring now to FIG. 4, the high strength porous expanded polytetrafluoroethylene film 32 is wrapped on the polytetrafluoroethylene core in a helical manner so that the high strength porous expanded polytetrafluoroethylene film forms a helical seam on the composite gasket material.

Figure 5:
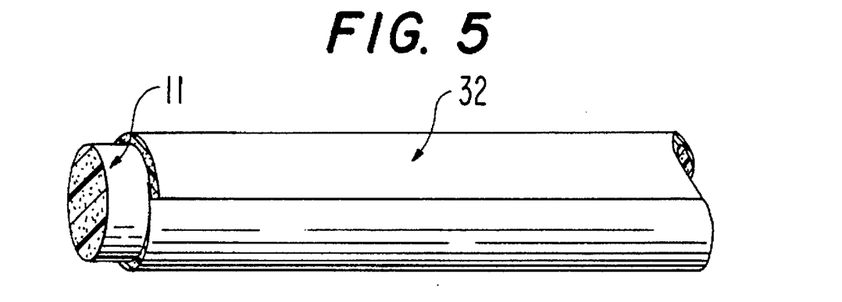
FIG. 5 is a perspective view of a longitudinally wrapped embodiment of the invention.

Referring now to FIG. 5, the high strength porous expanded polytetrafluoroethylene film 32 is wrapped on the polytetrafluoroethylene core in a longitudinal manner so that the high strength porous expanded polytetrafluoroethylene film forms a longitudinal seam on the composite gasket material.

Wrapping of the high strength porous expanded polytetrafluoroethylene film on the core of elongated polytetrafluoroethylene may be accomplished by hand. More preferably, the wrapping is accomplished through the use of a tape-wrap machine well known in the art of wrapping dielectric tape layers on conductors and taught in U.S. Pat. No. 3,756,004 to Gore, incorporated herein by reference. The tape wrap machine applies a degree of back tension to the high strength porous expanded polytetrafluoroethylene film as it wraps it in a helical fashion around the elongated polytetrafluoroethylene core. Back tension on the high strength porous expanded polytetrafluoroethylene film applies a compressive force to the core and thereby somewhat densifies the elongated polytetrafluoroethylene core. The degree of back tension applied to the high strength porous expanded polytetrafluoroethylene film may be varied so that the density of the elongated polytetrafluoroethylene core and final dimensions of the assembly may also be varied.

Densification, i.e., reduction in porosity, of the elongated porous expanded polytetrafluoroethylene core results in no change to the tensile strength or tensile modulus properties which were developed in it by the expansion process, however, densification has a substantial effect on the flex and compressive characteristics of the material. By partially densifying the core and then constraining it by wrapping it with the high strength porous expanded polytetrafluoroethylene film control over the amount of deformation required to fully densify it when in service can be exercised. In other words, a composite gasket material is produced such that a compressive load sufficient to provide an excellent seal can be applied to the composite gasket material with relatively little movement together of the sealing surfaces. Thus, the composite gasket material of the invention can provide a much thicker gasket that covers a much smaller sealing surface area than can be obtained from existing polytetrafluoroethylene gasket materials having lower density or strength.

Alternatively, other means for densifying the elongated porous expanded polytetrafluoroethylene core can be used prior to the application of the high strength porous expanded polytetrafluoroethylene film to the PTFE core. Other means for densifying porous expanded polytetrafluoroethylene include compression by platen presses, grooved or flat calender rolls, and reducing or forming dies.

The high strength porous expanded polytetrafluoroethylene film wrapped upon the elongated polytetrafluoroethylene core imparts a substantially increased measure of circumferential strength and restraint to the polytetrafluoroethylene core. The result is a composite gasket material with a reduced tendency to creep, i.e., a gasket material that has much greater resistance to becoming thinner and wider under steady compressive loads, compared to a PTFE gasket without the high strength porous expanded polytetrafluoroethylene wrap.

Figure 7:
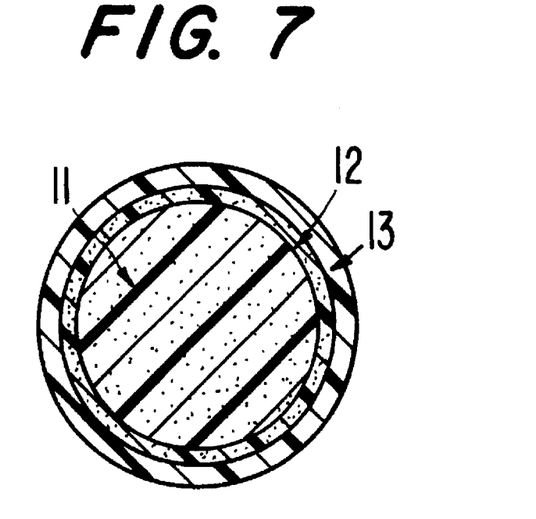
FIG. 7 is a cross-sectional view of an embodiment of the invention wrapped with two uncoated high strength porous expanded polytetrafluoroethylene films.
Figure 8:
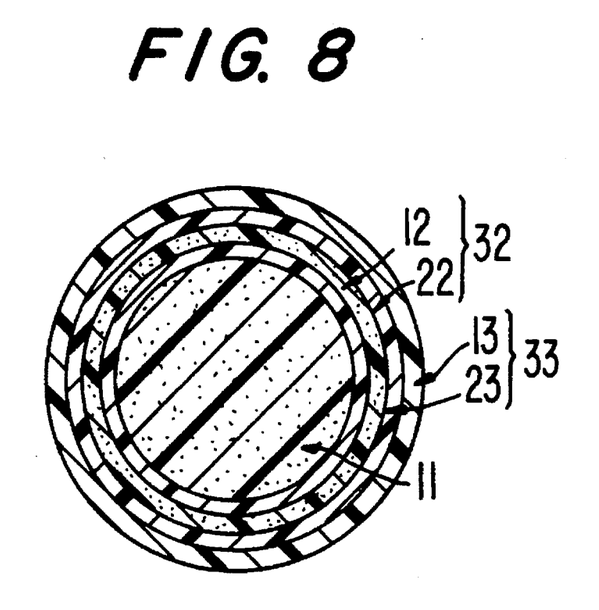
FIG. 8 is a cross-sectional view of an embodiment of the invention wrapped with two coated composite films.

Another embodiment of the invention shown in FIGS. 7 and 8 further comprises a second porous expanded polytetrafluoroethylene film 13, which may be coated with a melt-processible thermoplastic fluoropolymer 23 as described above, and which is wrapped upon the first high strength porous expanded polytetrafluoroethylene film 32. The second wrapped film 33 can have tensile properties which provide additional strength and creep resistance to the composite gasket material or, alternatively, can have lower tensile strength and tensile modulus properties than the first wrapped film in order to enhance sealing surface conformability of the gasket material.

Figure 6A:
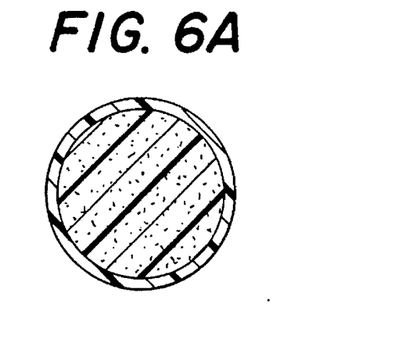
FIGS. 6A and 6B are cross-sectional views of embodiments of the invention shaped before wrapping.
Figure 6B:
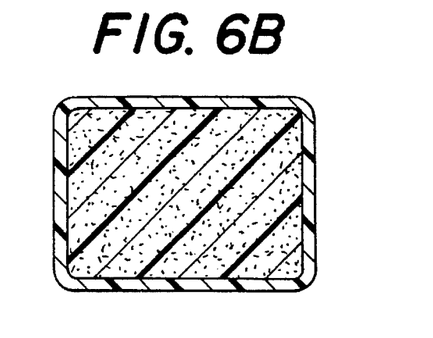
Figure 6C:
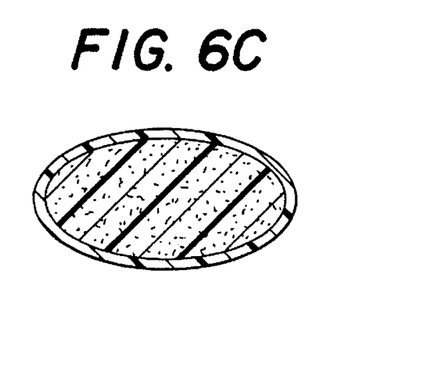
FIGS. 6C, 6D, and 6E are cross-sectional views of embodiments of the invention shaped after wrapping.
Figure 6D:
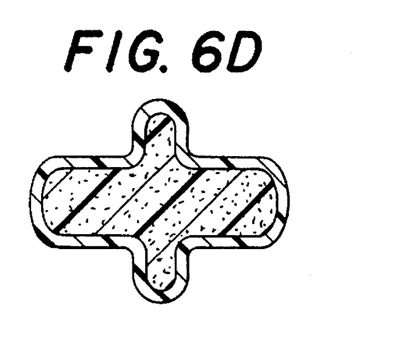
Figure 6E:
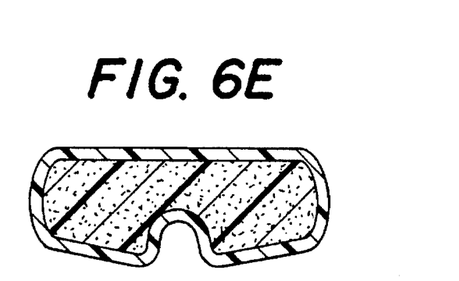

Referring now to FIGS. 6A, 6B, 6C, 6D, and 6E, the composite gasket material of the instant invention may have various cross sections. Among the possible cross sections, the composite gasket material may have a circular cross section as depicted in FIG. 6A, a rectangular cross section as depicted in FIG. 6B, an oval cross section as depicted in FIG. 6C, a cross section having projections as depicted in FIG. 6D and a cross section having depressions as depicted in FIG. 6E.

The following examples which disclose processes and products according to the present invention are illustrative only and are not intended to limit the scope of the present invention in any way.

Test Descriptions

Tensile Test

To determine the tensile properties of the high strength porous expanded polytetrafluoroethylene film, a 2.54 cm (1.0 inch) wide by 20.3 cm (8.0 inches) long sample of the film is obtained. Thickness of the film is determined with a snap micrometer gauge and width of the film is determined with a linear gauge. A constant rate-of-jaw-separation machine (Instron testing machine, Model 1122) is used to test samples to break. The gauge length of the specimen is 10.16 cm (4.0 inches). The strain rate employed is 2.54 cm/min (1.0 inch/min). Samples are tested to break. The tensile modulus at 2% extension and maximum stress are calculated and recorded as described in ASTM Standard Test Method D 882-91.

A population of five to eight samples is averaged to give each value listed herein.

Gasket Flow Test

Two sections of gasket material each 12.7 cm (5 inches) in length are obtained. The samples are mounted, in parallel alignment approximately 20 cm (8 inches) apart, between two 25.4 cm (10 inches) square rigid flat platens. An initial compressive load of 8.01 kN/linear cm (1800 lbf/linear in) is applied to the samples. The samples remain compressed for a period of 10 minutes at a temperature of 200° C. The compressive load is reduced by creep of the samples during the 10 minute compression period. No effort is made to maintain a constant load.

At the end of the compression period the samples are recovered and the distance around the perimeter ($P_f$) of the compressed sample is measured (in a direction perpendicular to the long axis of the sample). The $P_f$ measurement is compared to an initial perimeter measurement ($P_i$) of the sample taken in like manner prior to testing and the increase reported as Gasket Flow (GF) according to the formula:

$$GF, \text{percent} = (P_f - P_i / P_i) \times 100$$

EXAMPLE 1

A composite gasket material of the instant invention was produced in the following manner:

A 0.0127 mm (0.5 mil) FEP tape (50 A available from E. I. duPont de Nemours & Co.) was laminated to a porous PTFE sheet through the introduction of enough heat to melt and attach the FEP sheet to the porous PTFE sheet as follows:

The combined sheets were first longitudinally stretched an amount 1.5:1 at a temperature of approximately 330° C. over a heated curved platen, and then further longitudinally stretched an amount 1.5:1 in a second heated zone at a temperature of approximately 340° C., thus forming a high strength composite film having a total amount of expansion of 2.25:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.7 mm (0.46 inch).

The result was a composite gasket material of the instant invention.

Tensile properties of high strength composite film prepared as described in Example 1 were tested as described hereinabove. Tensile strength was 19.87 MPa (2882 psi) and 2% secant tensile modulus was 589.7 MPa (85520 psi). The composite gasket material of Example 1 was tested by the Gasket Flow Test described hereinabove and the results shown in Table 1.

EXAMPLE 2

A second example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 13.7 mm (0.54 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 13.3 mm (0.52 inch).

The result was a composite gasket material of the instant invention.

Tensile properties of high strength composite film prepared as described in Example 2 were tested as described hereinabove. Tensile strength was 173.7 MPa (25200 psi) and 2% secant tensile modulus was 5838 MPa (846700 psi). The composite gasket material of Example 2 was tested by the Gasket Flow Test described hereinabove and the results shown in Table 1.

EXAMPLE 3

A third example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 20:1 in a second heated zone at a temperature of approximately 340° C., thus forming a high strength composite film having a total amount of expansion of about 76:1. The composite film was subsequently heated at a temperature of 335° C. in a third heated zone at a stretch ratio of 1:1 so that no additional expansion occurred.

Subsequently, the composite film was slit lengthwise and helically wrapped upon a core of polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer.

Back tension was applied on the composite film so that when the wrapping of the beading was completed, the outside diameter of the wrapped beading was reduced to 11.9 mm (0.47 inch).

The result was a composite gasket material of the instant invention.

Tensile properties of high strength composite film prepared as described in Example 3 were tested as described hereinabove. Tensile strength was 212.7 MPa (30850 psi) and 2% secant tensile modulus was 7212 MPa (1046000 psi). The composite gasket material of Example 3 was tested by the Gasket Flow Test described hereinabove and the results shown in Table 1.

EXAMPLE 4

A fourth example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

The result was a composite gasket material of the instant invention.

Tensile properties of high strength composite film prepared as described in Example 4 were tested as described hereinabove. Tensile strength was 173.4 MPa (25200 psi) and 2% secant tensile modulus was 5838 MPa (846700 psi). The composite gasket material of Example 4 was tested by the Gasket Flow Test described hereinabove and the results shown in Table 1.

Comparative Example 1

For comparative purposes a section of commercially available wrapped porous polytetrafluoroethylene gasket material, Inertex ⅜" Valve Stem Packing, was obtained and tested as described in the examples above. A section of the tape wrapped around the core was unwound and samples were given the tensile test as described hereinabove except that the sample width was ½ inch. The results are also shown in Table 1.

TABLE 1

| Example | Film Tensile Strength (MPa) | Film Modulus @ 2% strain (MPa) | Gasket Flow (%) |
| --- | --- | --- | --- |
| 1 | 19.9 | 590 | 70 |
| 2 | 173.4 | 5838 | 15 |
| 3 | 212.7 | 7212 | 29 |
| 4 | 173.4 | 5838 | 40 |
| Comp. Ex. 1 | 6.6 | 79 | 137 |

We claim:

1. A composite gasket material comprising:
   (a) a core of elongated non-felted polytetrafluoroethylene, and
   (b) means to prevent substantial lateral flow and creep of the core under load, said means comprising a first porous expanded polytetrafluoroethylene film wrapped upon said core of polytetrafluoroethylene so as to restrain said core;
   said first porous expanded polytetrafluoroethylene film having in at least one direction a tensile strength of at least 13.8 MPa.

2. The composite gasket material as described in claim 1, wherein said core of elongated polytetrafluoroethylene is expanded polytetrafluoroethylene.

3. The composite gasket material as described in claim 1, wherein said core of elongated polytetrafluoroethylene has been compressed and restrained so that it has a cross-sectional surface area that is 90 percent or less of an initial cross-sectional area.

4. The composite gasket material as described in claim 3, wherein said core of elongated polytetrafluoroethylene has been compressed and restrained so that it has a cross-sectional surface area that is 80 percent or less of an initial cross-sectional area.

5. The composite gasket material as described in claim 4, wherein said core of elongated polytetrafluoroethylene has been compressed and restrained so that it has a cross-sectional surface area that is 60 percent or less of an initial cross-sectional area.

6. The composite gasket material as described in claim 1, wherein the first porous expanded polytetrafluoroethylene film is coated with a layer of melt-processible thermoplastic fluoropolymer;
   said layer of melt-processible thermoplastic fluoropolymer adhering said first porous expanded polytetrafluoroethylene film to the core of elongated polytetrafluoroethylene.

7. The composite gasket material as described in claim 6, wherein the layer of melt-processible thermoplastic fluoropolymer is selected from the group consisting of copolymer of tetrafluoroethylene and hexafluoropropylene, copolymer of tetrafluoroethylene and perfluoro(propyl vinyl ether), homopolymers of polychlorotrifluoroethylene and its copolymers with TFE or VF2, ethylene-chlorotrifluoroethylene copolymer, ethylene-tetrafluoroethylene copolymer, polyvinylidene fluoride, and polyvinylfluoride.

8. The composite gasket material as described in claim 1, wherein the core of elongated polytetrafluoroethylene contains a particulate filler.

9. The composite gasket material as described in claim 1, wherein the first porous expanded polytetrafluoroethylene film contains a particulate filler.

10. The composite gasket material as described in claim 1, further comprising a second porous expanded polytetrafluoroethylene film wrapped upon said first porous expanded polytetrafluoroethylene film.

11. The composite gasket material as described in claim 10, wherein the second porous expanded polytetrafluoroethylene film is coated with a layer of melt-processible thermoplastic fluoropolymer;

said layer of melt-processible thermoplastic fluoropolymer adhering said second porous expanded polytetrafluoroethylene film to said first porous expanded polytetrafluoroethylene film.

12. A composite gasket material comprising:

(a) a core of elongated non-felted polytetrafluoroethylene, and (b) means to prevent substantial lateral flow and creep of the core under load, said means comprising a first porous expanded polytetrafluoroethylene film wrapped upon said core of polytetrafluoroethylene so as to restrain said core;

said first porous expanded polytetrafluoroethylene film having in at least one direction a 2% secant tensile modulus of 172 MPa or greater.

13. The composite gasket material as described in claim 12, wherein said core of elongated polytetrafluoroethylene is expanded polytetrafluoroethylene.

14. The composite gasket material as described in claim 12, wherein said core of elongated polytetrafluoroethylene has been compressed and restrained so that it has a cross-sectional surface area that is 90 percent or less of an initial cross-sectional area.

15. The composite gasket material as described in claim 14, wherein said core of elongated polytetrafluoroethylene has been compressed and restrained so that it has a cross-sectional surface area that is 80 percent or less of an initial cross-sectional area.

16. The composite gasket material as described in claim 15, wherein said core of elongated polytetrafluoroethylene has been compressed and restrained so that it has a cross-sectional surface area that is 60 percent or less of an initial cross-sectional area.

17. The composite gasket material as described in claim 12, wherein the first porous expanded polytetrafluoroethylene film is coated with a layer of melt-processible thermoplastic fluoropolymer;

said layer of melt-processible thermoplastic fluoropolymer adhering said first porous expanded polytetrafluoroethylene film to the core of elongated polytetrafluoroethylene.

18. The composite gasket material as described in claim 17, wherein the layer of melt-processible thermoplastic fluoropolymer is selected from the group consisting of copolymer of tetrafluoroethylene and hexafluoropropylene, copolymer of tetrafluoroethylene and perfluoro(propyl vinyl ether), homopolymers of polychlorotrifluoroethylene and its copolymers with TFE or VF2, ethylene-chlorotrifluoroethylene copolymer, ethylene-tetrafluoroethylene copolymer, polyvinylidene fluoride, and polyvinylfluoride.

19. The composite gasket material as described in claim 12, wherein the core of elongated polytetrafluoroethylene contains a particulate filler.

20. The composite gasket material as described in claim 12, wherein the first porous expanded polytetrafluoroethylene film contains a particulate filler.

21. The composite gasket material as described in claim 12, further comprising a second porous expanded polytetrafluoroethylene film wrapped upon said first porous expanded polytetrafluoroethylene film.

22. The composite gasket material as described in claim 21, wherein the second porous expanded polytetrafluoroethylene film is coated with a layer of melt-processible thermoplastic fluoropolymer;

said layer of melt-processible thermoplastic fluoropolymer adhering said second porous expanded polytetrafluoroethylene film to said first porous expanded polytetrafluoroethylene film.

23. A composite gasket material comprising:

(a) a core of elongated non-felted polytetrafluoroethylene, and (b) means to prevent substantial lateral flow and creep of the core under load, said means comprising a first porous expanded polytetrafluoroethylene film wrapped upon said core of polytetrafluoroethylene so as to restrain said core;

said first porous expanded polytetrafluoroethylene film having in at least one direction a tensile strength of at least 13.8 MPa and a 2% secant tensile modulus of 172 MPa or greater.

24. The composite gasket material as described in claim 23, wherein said core of elongated polytetrafluoroethylene is expanded polytetrafluoroethylene.

25. The composite gasket material as described in claim 23, wherein said core of elongated polytetrafluoroethylene has been compressed and restrained so that it has a cross-sectional surface area that is 90 percent or less of an initial cross-sectional area.

26. The composite gasket material as described in claim 25, wherein said core of elongated polytetrafluoroethylene has been compressed and restrained so that it has a cross-sectional surface area that is 80 percent or less of an initial cross-sectional area.

27. The composite gasket material as described in claim 26, wherein said core of elongated polytetrafluoroethylene has been compressed and restrained so that it has a cross-sectional surface area that is 60 percent or less of an initial cross-sectional area.

28. The composite gasket material as described in claim 23, wherein the first porous expanded polytetrafluoroethylene film is coated with a layer of melt-processible thermoplastic fluoropolymer;

said layer of melt-processible thermoplastic fluoropolymer adhering said first porous expanded polytetrafluoroethylene film to the core of elongated polytetrafluoroethylene.

29. The composite gasket material as described in claim 28, wherein the layer of melt-processible thermoplastic fluoropolymer is selected from the group consisting of copolymer of tetrafluoroethylene and hexafluoropropylene, copolymer of tetrafluoroethylene and perfluoro(propyl vinyl ether), homopolymers of polychlorotrifluoroethylene and its copolymers with TFE or VF2, ethylene-chlorotrifluoroethylene copolymer, ethylene-tetrafluoroethylene copolymer, polyvinylidene fluoride, and polyvinylfluoride.

30. The composite gasket material as described in claim 23, wherein the core of elongated polytetrafluoroethylene contains a particulate filler.

31. The composite gasket material as described in claim 23, wherein the first porous expanded polytetrafluoroethylene film contains a particulate filler.

32. The composite gasket material as described in claim 23, further comprising a second porous expanded polytetrafluoroethylene film wrapped upon said first porous expanded polytetrafluoroethylene film.

33. The composite gasket material as described in claim 32, wherein the second porous expanded polytetrafluoroethylene film is coated with a layer of melt-processible thermoplastic fluoropolymer; said layer of melt-processible thermoplastic fluoropolymer adhering said second porous expanded polytetrafluoroethylene film to said first porous expanded polytetrafluoroethylene film.

* * * * *